United States Patent
Lundström et al.

[11] Patent Number: 6,135,678
[45] Date of Patent: Oct. 24, 2000

[54] CUTTING INSERT FOR GROOVING OPERATIONS

[75] Inventors: Jan Lundström; Pär Tägtström, both of Sandviken, Sweden

[73] Assignee: Sandvik Aktiebolag, Sandviken, Sweden

[21] Appl. No.: 09/194,926
[22] PCT Filed: May 13, 1997
[86] PCT No.: PCT/SE97/00789
§ 371 Date: May 14, 1999
§ 102(e) Date: May 14, 1999
[87] PCT Pub. No.: WO97/46346
PCT Pub. Date: Dec. 11, 1997

[30] Foreign Application Priority Data

Jun. 6, 1996 [SE] Sweden .................................. 9602231

[51] Int. Cl.⁷ .................................................... B23B 27/22
[52] U.S. Cl. ............................. 407/117; 407/116; 407/114
[58] Field of Search .................................. 407/113, 114, 407/116, 117

[56] References Cited

U.S. PATENT DOCUMENTS

| Re. 30,908 | 4/1982 | Friedline et al. ....................... 407/114 |
| 3,466,720 | 9/1969 | Stier ........................................ 407/113 |
| 3,818,561 | 6/1974 | Montana et al. ....................... 407/113 |
| 3,887,974 | 6/1975 | Sorice ..................................... 407/113 |
| 4,027,782 | 6/1977 | Stansak ................................... 407/113 |
| 4,104,312 | 8/1978 | Angstadt et al. . |
| 4,531,864 | 7/1985 | Bylund .................................. 407/114 |
| 4,583,887 | 4/1986 | Wertheimer ............................ 407/116 |
| 4,629,372 | 12/1986 | Huston . |
| 4,856,942 | 8/1989 | Bernadic et al. . |
| 4,875,812 | 10/1989 | Haque et al. . |
| 4,969,779 | 11/1990 | Barten ..................................... 407/114 |
| 4,993,893 | 2/1991 | Niebauer . |
| 5,076,739 | 12/1991 | Pano . |
| 5,180,258 | 1/1993 | Bernadic . |
| 5,205,680 | 4/1993 | Lindstedt ............................... 407/116 |
| 5,221,164 | 6/1993 | Allaire ................................... 407/114 |
| 5,375,948 | 12/1994 | Lindstedt . |
| 5,411,354 | 5/1995 | Gustafsson . |
| 5,423,639 | 6/1995 | Wiman . |
| 5,503,507 | 4/1996 | Lowe et al. . |
| 5,511,911 | 4/1996 | Katbi et al. ............................ 407/114 |
| 5,829,924 | 11/1998 | Oshnock et al. ....................... 407/117 |
| 5,951,215 | 9/1999 | Paya et al. ............................. 407/113 |

FOREIGN PATENT DOCUMENTS

| 242-343 | 10/1987 | European Pat. Off. .............. 407/117 |
| 0 264 013 | 4/1988 | European Pat. Off. . |
| 0 559 965 | 9/1993 | European Pat. Off. . |

*Primary Examiner*—A. L. Wellington
*Assistant Examiner*—Erica Ergenbright
*Attorney, Agent, or Firm*—Burns, Doane, Swecker & Mathis, L.L.P.

[57] ABSTRACT

A cutting insert for the turning of grooves in metallic work pieces includes a rear shank portion and a cutting head projecting forwardly from the rear shank portion. The cutting head includes two side cutting edges converging forwardly, and a main cutting edge interconnecting the front ends of the side cutting edges. Each side cutting edge includes a plurality of spaced apart grooves formed therein, whereby each side cutting edge is noncontinuous.

11 Claims, 2 Drawing Sheets

CUTTING INSERT FOR GROOVING OPERATIONS

BACKGROUND OF THE INVENTION

The present invention relates to a cutting insert for grooving operations, and is particularly suitable for different radial groove cutting and groove turning operations as well as the profiling of grooves with small angles, for example, the production of grooves for piston rings.

During such machining, chip breaking and chip forming often have a decisive influence on the number of interruptions in production. Modern, high productive machines put very high demands on good chip removal. Long, uncontrollable chips can easily cause breakdowns in production and result in defective components which have to be scrapped. Close attention must therefore be paid to chip control and it must be allowed to have a major influence on the design of the tool.

Cutting inserts intended for the turning of grooves and parting operations are generally clamped in holders, which are of the blade type, in order that they can be used in confined spaces. Such cutting inserts are, for example, known through U.S. Pat. No. 5,375,948 and 5,423,639.

It has been established that cutting inserts, known until now, for the radial turning of grooves have not always functioned satisfactorily. The chips are not broken adequately and chip control is substandard.

The first purpose of the present invention is consequently to produce an insert which is well suited for the repeated, radial turning of grooves.

The second purpose of the present invention is to produce an insert which can also be used for profiling and longitudinal turning, in particular the profiling of the sides of a groove with small angles.

An additional purpose of the present invention is to produce an insert which can also, in a reliable manner, carry out the first cut, during which a long, unbroken chip is generally formed.

SUMMARY OF THE INVENTION

These and other purposes have been achieved by a cutting insert for the turning of grooves in metallic work pieces. The cutting insert comprises a rear shank portion and a forward cutting head projecting forwardly from the rear shank portion. The cutting head includes a top side, an underside, two flank side surfaces each interconnecting the top side with the underside, and a forwardly facing front flank surface interconnecting the flank side surfaces. Each flank side surface forms an acute angle with the top side. A transition between the flank front surface and the top side forms a main cutting edge. A transition between each flank side surface and the top side forms a side cutting edge. The side cutting edges extend on respective opposite sides of a center line of the cutting head and converge in a forward direction. The side cutting edges form an acute angle between one another. Each side cutting edge includes a plurality of spaced-apart grooves formed therein, whereby each side cutting edge is non-continuous.

BRIEF DESCRIPTION OF THE DRAWINGS

The invention is now described in more detail with reference to the enclosed drawings in order to better clarify but in no way limit the invention.

The drawings are presented in brief herewith.

DETAILED DESCRIPTION OF A PREFERRED EMBODIMENT OF THE INVENTION

Figure 1:
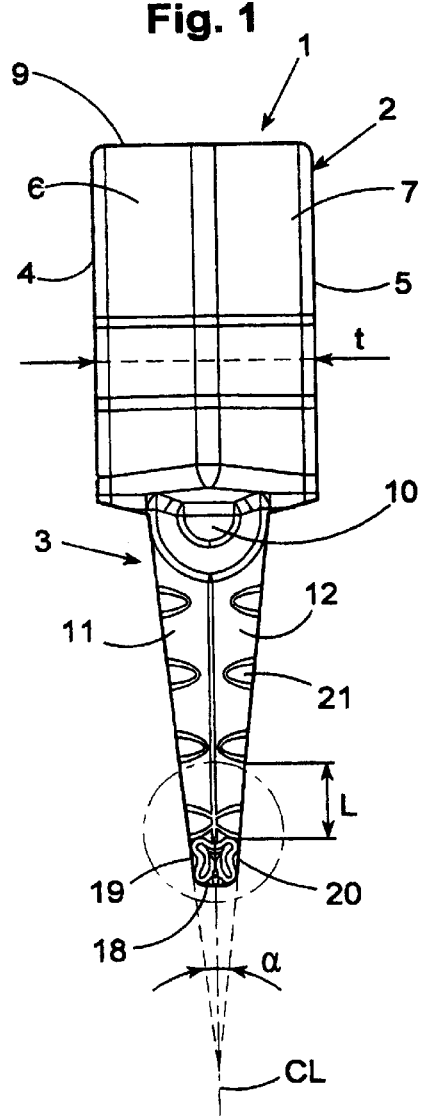
FIG. 1 shows an insert according to the invention in a view, as seen from above.

With reference to FIG. 1 an insert (1) is shown which is made of a hard and wear resistance material such as cemented carbide, including a rear shank portion (2) and a forward cutting head (3). The rear portion of the shank (2) comprises two substantially plane parallel side surfaces (4, 5) two upper, obliquely inward sloping edge surfaces, (6, 7) a bottom surface (8) formed in a corresponding manner, a rear end surface (9) forming a right angle with the side surfaces (4, 5) as well as a forward shoulder (10) which forms a transition between the shank portion (2) and the cutting head (3) whereby the crest of the shoulder (10) defines the highest distance h of the insert above the neutral plane P. The bottom surface (8) constitutes a first support surface for the insert against a matching holder body, which holder body is intended to be parallel with the neutral plane P of the matching machine tool. The insert is intended to be fixed in the holder body by an integrated clamping arm acting against the upper surfaces (6, 7), whereby the insert becomes clamped in the working position through the spring force which the arm exerts on the insert. The clamping of the insert is described in commonly-assigned U.S. Pat. No. 5,411,354 which is incorporated herein by reference. The distance t between the side surfaces (4, 5) forms the largest width of the insert.

The forward cutting head (3) is composed of a top side defined by two upper obliquely downwards and inwards sloping surfaces (11 and 12), an underside defined by two bottom surfaces (13, 14) which slope obliquely in a corresponding manner, two vertical flank side surfaces (15, 16) extending between the upper surfaces (11, 12) and the bottom surfaces (13, 14) to form an acute angle with the upper surfaces (11) respectively (12) as well as a forward end surface (17). The surface (11, 12) thus converge toward the center line CL to form a V-shape, the surfaces (11, 12) intersecting one another along a line V. The transition line between the upper surfaces (11, 12) and the end surface (17) forms the major cutting edge (18) while the transition lines between the side surfaces (15, 16) and the respective upper surfaces (11, 12) form side cutting edges (19 and 20) respectively. Both of the oblique surfaces (11, 12) connect at the rear to an upward sloping surface of the shoulder (10) which preferably has a half cylindrical form when viewed from above.

Distinguishing for the insert are that the two side surfaces (15, 16) and the associated side edges (19, 20) converge forwardly to form an acute angle α between them, which amounts to 1.5–20°, and preferably 1.5–5°, and that a number of grooves (21) which are separate from each other are formed in the upper surfaces (11, 12) in such a manner that the cutting edge on each side of the lengthwise center line (CL) of the insert constitutes a non-continuous cutting edge. Each groove (21) extends inwards towards the center line in a direction essentially at right angles to the center line (CL). The width and depth of each groove (21) decrease progressively as the groove approaches the center line. The maximum width of the groove (21) in the plane of the side surfaces (15, 16) is preferably less than the distance between two adjacent grooves. The groove (21) is mainly V-shaped as viewed from the side, whereby the side-walls (22 and 23) of the groove enclose an angle of the order of 65–90° in size. The side-walls of the groove (21) are mainly plane, and the bottom of the groove is curved.

Figure 2:
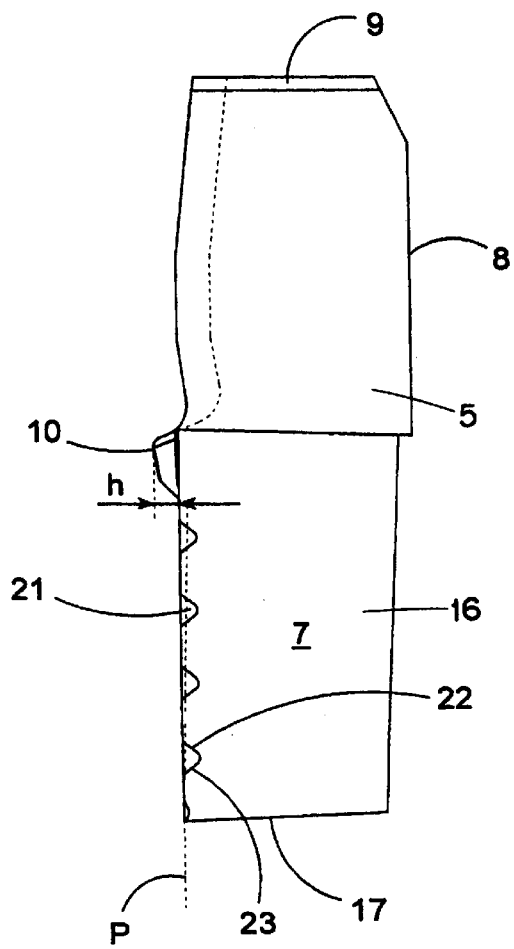
FIG. 2 shows an insert according to the invention in a side view.
Figure 3:
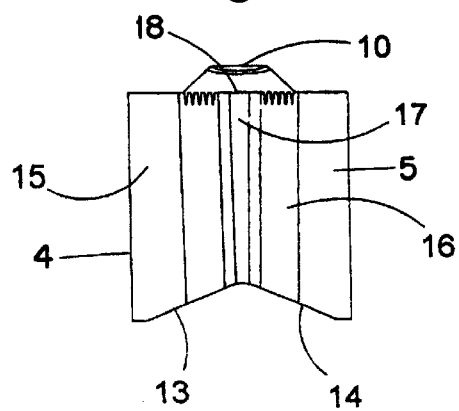
FIG. 3 shows the same insert as in FIG. 2, straight from the front.
Figure 4:
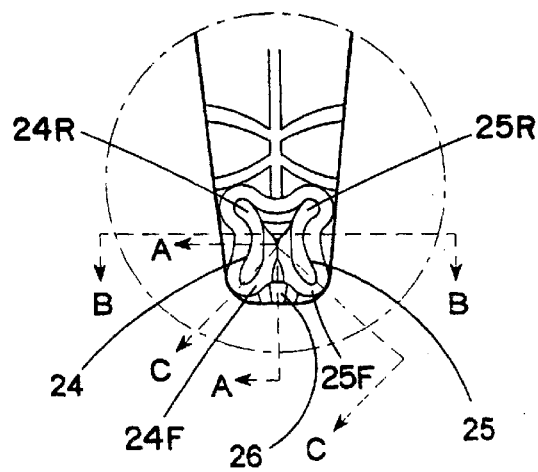
FIG. 4 shows the same insert as in FIG. 2, in an enlarged view seen straight from above.
Figure 5:
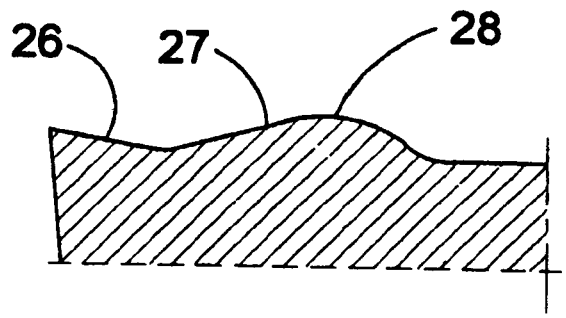
FIG. 5 shows the section A—A in FIG. 4.
Figure 6:
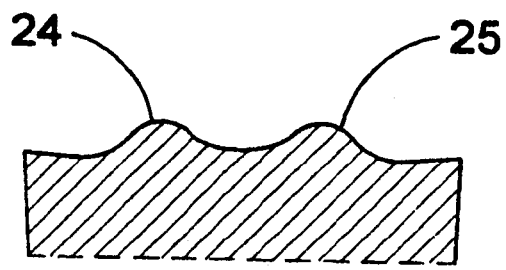
FIG. 6 shows the section B—B in FIG. 4.
Figure 7:
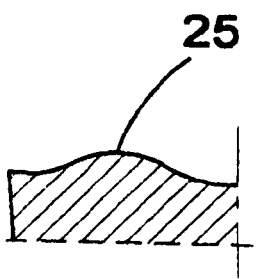
FIG. 7 shows the section C—C in FIG. 4.

At the forward end of the insert the upper surface has two symmetrically positioned protrusions (24 and 25) on each side of the center line (CL) and at a distance from each other. These protrusion have an oblong shape. The forward nose parts 24F, 25F of these protrusions are convergent relative to one another in a rearward direction, as seen from the major cutting edge (18) and the rear parts 24R, 25R are divergent relative to one another. The upper surface of each of the protrusions is mainly flat and limited by angled, downward sloping surfaces. The upper surface of each of the protrusions is situated at the same level as, or slightly under, a plane which includes the main and the side cutting edges as is best seen in FIG. 2.

By providing such protrusions (24, 25) at a distance from each other the initial chip breaking will occur against them. When the cutting depth and the rate of feed increase, the shear angle on the chip will change. The formation of the protrusions is such that the chip breaking function is not influenced negatively when the depth of cut increases. As the cutting depth increases, the interaction between the insert and the workpiece occurs on three different sides, i.e. along the major cutting edge (18) and the two side cutting edges (19, 20) at which point the grooves (21) begin to play an active role and contribute to reducing the width of the chips. This helps to avoid the formation of chips which are too thin and difficult to handle. A surface (26) which slopes from the main cutting edge (18) inwards (i.e., rearwardly) and obliquely downwards and which is situated between the nose parts 24F, 25F of the two protrusions (24, 25) also contributes to the "creasing" of the chip. This surface connects to an upwards sloping surface (27) situated between protrusions (24, 25) where the crest (28) of the surface (27) is situated on a level somewhat under that of the top surfaces of the upper planes of the protrusions (24, 25).

This geometry results in an insert which is excellently suited for radial turning of grooves as well as profiling and longitudinal turning.

What is claimed is:

1. A cutting insert for the turning of grooves in metallic workpieces, the cutting insert comprising a rear shank portion and a cutting head projecting forwardly from the rear shank portion; the cutting head including a top side, an underside, two flank side surfaces each interconnecting the top side with the underside, and a forwardly facing front flank surface interconnecting the flank side surfaces; each flank side surface forming an acute angle with the top side; a transition between the flank front surface and the top side forming a main cutting edge; a transition between each flank side surface and the top side forming a side cutting edge; the side cutting edges extending on respective opposite sides of a center line of the cutting head and converging in a forward direction, the side cutting edges forming an acute angle between one another; each side cutting edge including a plurality of spaced-apart grooves formed therein, whereby each side cutting edge is non-continuous wherein the side cutting edges form an angle of from 1.5–20.0° between one another.

2. The cutting insert according to claim 1 wherein each of the grooves extends from the respective side cutting edge at substantially a right angle toward the center line, each groove having a width of decreasing dimension as the distance from the respective side cutting edge increases; a largest width of each groove being smaller than a spacing between adjacent grooves.

3. The cutting insert according to claim 1 wherein each of the grooves has a depth of decreasing dimension as the distance from the respective side cutting edge increases.

4. The cutting insert according to claim 1 further including a pair of protrusions disposed on the top side and adjacent the main cutting edge; the protrusions arranged symmetrically on opposite respective sides of the center line.

5. The cutting insert according to claim 4 wherein the top side slopes downwardly from the main cutting edge between the protrusions.

6. The cutting insert according to claim 5 wherein the top side, after sloping downwardly and rearwardly, slopes upwardly and rearwardly between the protrusions.

7. The cutting insert according to claim 1 further including a shoulder extending upwardly from the top side and having a downwardly and forwardly inclined forwardly facing surface merging with rear ends of the upper surfaces, the shoulder having a semi-cylindrical shape as viewed from above.

8. The cutting insert according to claim 1 wherein each of the grooves comprises two sides arranged in a V-shape as viewed from the side, the two sides forming therebetween an angle of from 65 to 90°.

9. The cutting insert according to claim 8 wherein the sides of each groove are of plane shaped and converge to form a bottom of the groove, the bottom being curved.

10. A cutting insert for the turning of grooves in metallic workpieces, the cutting insert comprising a rear shank portion and a cutting head projecting forwardly from the rear shank portion; the cutting head including a top side, an underside, two flank side surfaces each interconnecting the top side with the underside, and a forwardly facing front flank surface interconnecting the flank side surfaces; each flank side surface forming an acute angle with the top side; a transition between the flank front surface and the top side forming a main cutting edge; a transition between each flank side surface and the top side forming a side cutting edge; the side cutting edges extending on respective opposite sides of a center line of the cutting head and converging in a forward direction, the side cutting edges forming an acute angle between one another; each side cutting edge including a plurality of spaced-apart grooves formed therein, whereby each side cutting edge is non-continuous, wherein the top side comprises two upper surfaces converging downwardly toward the center line, whereby the top side is V-shaped as viewed in a cross sectional plane oriented perpendicular to the center line.

11. A cutting insert for the turning of grooves in metallic workpieces, the cutting insert comprising a rear shank portion and a cutting head projecting forwardly from the rear shank portion; the cutting head including a top side, an underside, two flank side surfaces each interconnecting the top side with the underside, and a forwardly facing front flank surface interconnecting the flank side surfaces; each flank side surface forming an acute angle with the top side; a transition between the flank front surface and the top side forming a main cutting edge; a transition between each flank side surface and the top side forming a side cutting edge; the side cutting edges extending on respective opposite sides of a center line of the cutting head and converging in a forward direction, the side cutting edges forming an acute angle between one another; each side cutting edge including a plurality of spaced-apart grooves formed therein, whereby each side cutting edge is non-continuous, wherein the underside comprises two surfaces sloping upwardly toward the center line.

* * * * *